US006738739B2

(12) United States Patent
Gao

(10) Patent No.: US 6,738,739 B2
(45) Date of Patent: May 18, 2004

(54) VOICED SPEECH PREPROCESSING EMPLOYING WAVEFORM INTERPOLATION OR A HARMONIC MODEL

(75) Inventor: Yang Gao, Mission Viejo, CA (US)

(73) Assignee: Mindspeed Technologies, Inc., Newport Beach, CA (US)

(*) Notice: Subject to any disclaimer, the term of this patent is extended or adjusted under 35 U.S.C. 154(b) by 391 days.

(21) Appl. No.: 09/784,360

(22) Filed: Feb. 15, 2001

(65) Prior Publication Data

US 2002/0111797 A1 Aug. 15, 2002

(51) Int. Cl.[7] ........................ G10L 11/04; G10L 19/02; G10L 15/20; G10L 11/06; G10L 21/02

(52) U.S. Cl. ........................ 704/207; 704/203; 704/233; 704/208; 704/275

(58) Field of Search ................................ 704/207, 208, 704/211, 227, 230, 265, 275

(56) References Cited

U.S. PATENT DOCUMENTS

| | | | | |
|---|---|---|---|---|
| 4,852,169 A | * | 7/1989 | Veeneman et al. | 704/207 |
| 5,528,723 A | * | 6/1996 | Gerson et al. | 704/211 |
| 5,890,108 A | | 3/1999 | Yeldener | |
| 5,903,866 A | * | 5/1999 | Shoham | 704/265 |
| 5,978,764 A | * | 11/1999 | Lowry et al. | 704/208 |
| 5,991,725 A | * | 11/1999 | Asghar et al. | 704/270 |
| 6,226,615 B1 | * | 5/2001 | Kirby et al. | 704/275 |
| 6,233,550 B1 | * | 5/2001 | Gersho et al. | 704/208 |
| 6,377,916 B1 | * | 4/2002 | Hardwick | 704/208 |
| 6,453,289 B1 | * | 9/2002 | Ertem et al. | 704/227 |
| 6,567,778 B1 | * | 5/2003 | Chao Chang et al. | 704/275 |

FOREIGN PATENT DOCUMENTS

| | | | | |
|---|---|---|---|---|
| EP | 1199710 | | 4/2002 | |
| JP | 09-281996 | * | 10/1997 | G10L/9/00 |
| JP | WO 00 74036 A | | 12/2000 | |
| JP | 001199710 A1 | * | 4/2002 | G10L/19/00 |
| WO | WO 95 24776 A | | 9/1995 | |
| WO | WO 95/24776 | * | 9/1995 | |

OTHER PUBLICATIONS

Marques et al ("Harmonic Coding at 4.8 kb/s", International Conference on Acoustics, Speech, and Signal Processing, Apr. 1990) harmonically related frequency use extend to unvoiced and transition regions for large frame length.*

Jiang et al ("Kbps–2.4 Kbps Low Complexity Interpolative Vocoder", International Conference on Communication Technology Oct. 1998) interpolative speech coding algorithm including one–frame look ahead pitch smoothing.*

Kleijn et al ("A Low–Complexity Waveform Interpolation Coder", IEEE International Conference on Acoustics, Speech, and Signal Processing, May 1996) addresses waveform smoothing.*

Burnett I S et al: "A Mixed Prototype Waveform/ CELP Coder for Sub 3 kbit/s" Statistical Signal and Array Processing, Minneapolis, Apr. 27–30, 1993, Proceedings of the International Conference on Acoustics, Speech, and Signal Processing (ICASSP), New York, IEEE, US, vol. 4, Apr. 27, 1993, pp. 175–178, XP010110423, ISBN: 0–7803–0946–4, chapters 2, 2.1—2.3, chapter 5, lines 1–7.

* cited by examiner

*Primary Examiner*—Richemond Dorvil
*Assistant Examiner*—Daniel A Nolan
(74) *Attorney, Agent, or Firm*—Farjami & Farjami LLP

(57) ABSTRACT

Voiced speech preprocessing employs waveform interpolation or a harmonic model circuit to smooth a transition region and simplify speech coding. At low bit rates, the speech is coded by a system that maintains a high perceptual quality in the transition region from a voiced (quasi-periodic) portion of the speech signal to an unvoiced (non-periodic) portion of the speech signal. Similarly, the transition region from an unvoiced portion to a voiced portion is conditioned to maintain a high perceptual quality at a low bandwidth. The transition region from one type of voiced region to another type of voiced region is also smoothed. The transition region is smoothed to create a quasi-periodic speech signal.

29 Claims, 9 Drawing Sheets

VOICED SPEECH PREPROCESSING EMPLOYING WAVEFORM INTERPOLATION OR A HARMONIC MODEL

BACKGROUND OF THE INVENTION

1. Field of the Invention

This invention relates to speech coding, and more particularly, to a system that performs speech pre-processing.

2. Related Art

Speech coding systems often do not operate at low bandwidths. When the bandwidth of a speech coding system is reduced, the perceptual quality of its output, a synthesized speech, is often reduced. In spite of this loss, there is an effort to reduce speech coding bandwidths.

Some speech coding systems perform strict waveform matching using code excited linear prediction (CELP) at low bandwidths such as 4 kbit/s. The waveform matching used by these systems do not always accurately encode and decode speech signals due to the system's limited capacity. This invention provides an efficient speech coding system and a method that modifies an original speech signal in transition areas, and accurately encodes and decodes the modified speech signal to keep the perceptually important features of a speech signal.

SUMMARY

A speech codec includes a classifier and a periodic smoothing circuit. The classifier processes a transition region that separates portions of a speech signal. The periodic smoothing circuit uses at least an interpolated pitch lag and/or a constant pitch lag to smooth the transition region that is represented by a residual signal, a weighted signal, or a portion of an unconditioned speech signal. The pitch track corresponds to the voiced portion of the speech signal.

In one aspect, the periodic smoothing circuit selects either a forward pitch extension or a backward pitch extension to smooth the transition region between two periodic signals. The transition region can extend through multiple frames and may include an unvoiced portion. The periodic smoothing circuit smoothes the transition region between these signals in the time domain using a waveform interpolation circuit, or in the frequency domain using a harmonic circuit. The smoothing may occur when a long term pre-processing circuit or a long term processing circuit fails or when an irregular voiced speech portion is detected.

In another aspect, the periodic smoothing circuit smoothes the transition region between a periodic portion of a speech signal and other portions of that signal. In this aspect, smoothing occurs in the time domain using the waveform interpolation circuit or in the frequency domain using the harmonic circuit. The classifier uses a pitch lag, a linear prediction coefficient, an energy level, a normalized pitch correlation, and/or other parameters to classify the speech signal.

Other systems, methods, features and advantages of the invention will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. Moreover, in the figures, like reference numerals designate corresponding parts throughout the different views.

The dashed connections shown in FIGS. 1–3, 8, and 9, represent direct and indirect connections. As shown, other circuits, functions, devices, etc. can be coupled between the illustrated blocks. Similarly, the dashed boxes illustrate optional circuits or functionality.

DETAILED DESCRIPTION

A preferred system maintains a smooth transition between portions of a speech signal. During an onset or an offset transition from a voiced speech signal to an unvoiced speech signal, the system performs a periodic smoothing. The system initiates the periodic smoothing when a long term processing (LTP) failure, a pre-processing (PP) failure, and/or an irregular voiced speech portion is detected. A classifier detects the transition region and a smoothing circuit transforms that region into a more periodic signal in the time or the frequency domain.

Figure 1:
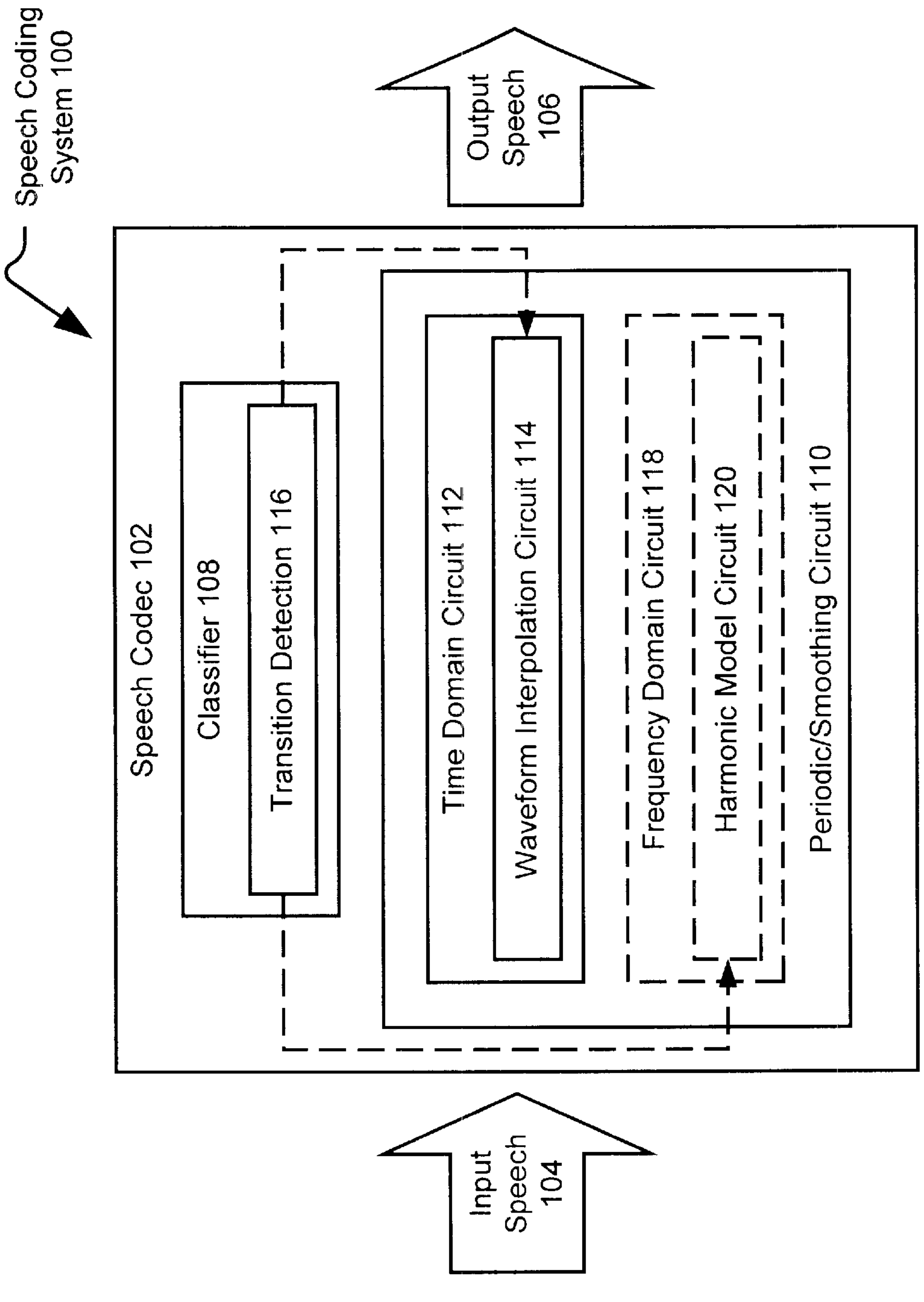
FIG. 1 illustrates a speech coding system.

FIG. 1 is a diagram of an embodiment of a speech coding system 100. The speech coding system 100 includes a speech codec 102 that conditions an input speech signal 104 into an output speech signal 106. The speech codec 102 includes a classifier 108, a periodic/smoothing circuit 110, a time domain circuit 112, a waveform interpolation circuit 114, and a transition detection circuit 116.

The speech coding system 100 operates in the time and the frequency domains. When operating in the frequency domain, the periodic/smoothing circuit 110 uses a frequency domain circuit 118 and a harmonic model circuit 120. In the frequency domain, the transition detection circuit 116 initiates a transformation of the input speech signal 104 to a more periodic output speech signal 106 through the harmonic model circuit 120. In the time domain, the transition detection circuit 116 initiates a transformation of the input speech signal 104 to a more periodic speech signal 106 through the waveform interpolation circuit 114.

Figure 2:
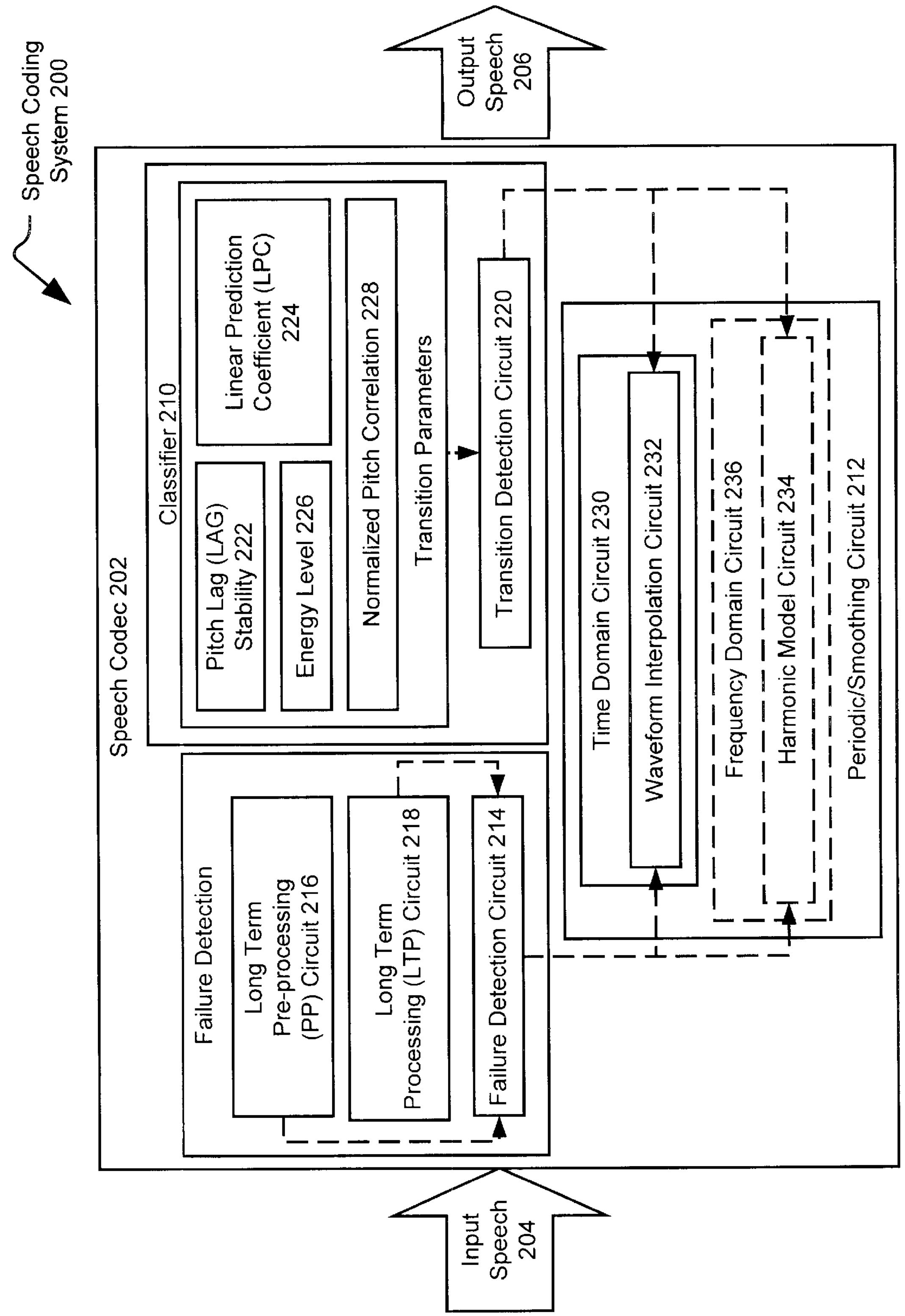
FIG. 2 illustrates a second speech coding system.

FIG. 2 illustrates a second embodiment of a speech coding system 200. The speech coding system 200 includes a speech codec 202 that conditions an input speech signal 204 into the output speech signal 206. The speech codec 202 includes a classifier 210, a periodic/smoothing circuit 212, and a failure detection circuit 214. The failure detection circuit 214 detects the failure of a long term pre-processing (PP) circuit 216 and a long term processing (LTP) circuit 218. The classifier 210 includes a transition detection circuit 220 that processes transition parameters. The transition parameters preferably include a pitch lag stability 222, a linear prediction coefficient (LPC) 224, an energy level indicator 226, and a normalized pitch correlation 228.

As shown in FIG. 2, the periodic/smoothing circuit 212 includes a waveform interpolation circuit 232 that is a unitary part of or is integrated within a time domain circuit 230. The transition detection circuit 220 initiates a temporal transformation of the input speech signal 204 to a more periodic output speech signal 206. When the failure detection circuit 214 detects a long term pre-processing (PP) circuit 216 failure, a long term processing (LTP) circuit 218 failure, and/or an irregular voiced speech portion, the failure detection circuit 214 initiates a waveform interpolation in the time domain. Once initiated, the waveform interpolation circuit 232 performs a transformation of the input speech 204 to a more periodic output speech signal 206. The periodic smoothing circuit 212 can employ an interpolated pitch lag and/or a constant pitch lag.

When the speech coding system 200 operates in the frequency domain, the periodic/smoothing circuit 212 uses a frequency domain circuit 236 and a harmonic model circuit 234 to perform a frequency transformation. In the frequency domain, the transition detection circuit 220 initiates the transformation of the input speech 204 to a more periodic speech signal using the harmonic model circuit 234. When desired, the failure detection circuit 214 initiates the harmonic model circuit 234 to transform the input speech 204 to a more periodic speech signal 206 in the frequency domain.

Figure 3:
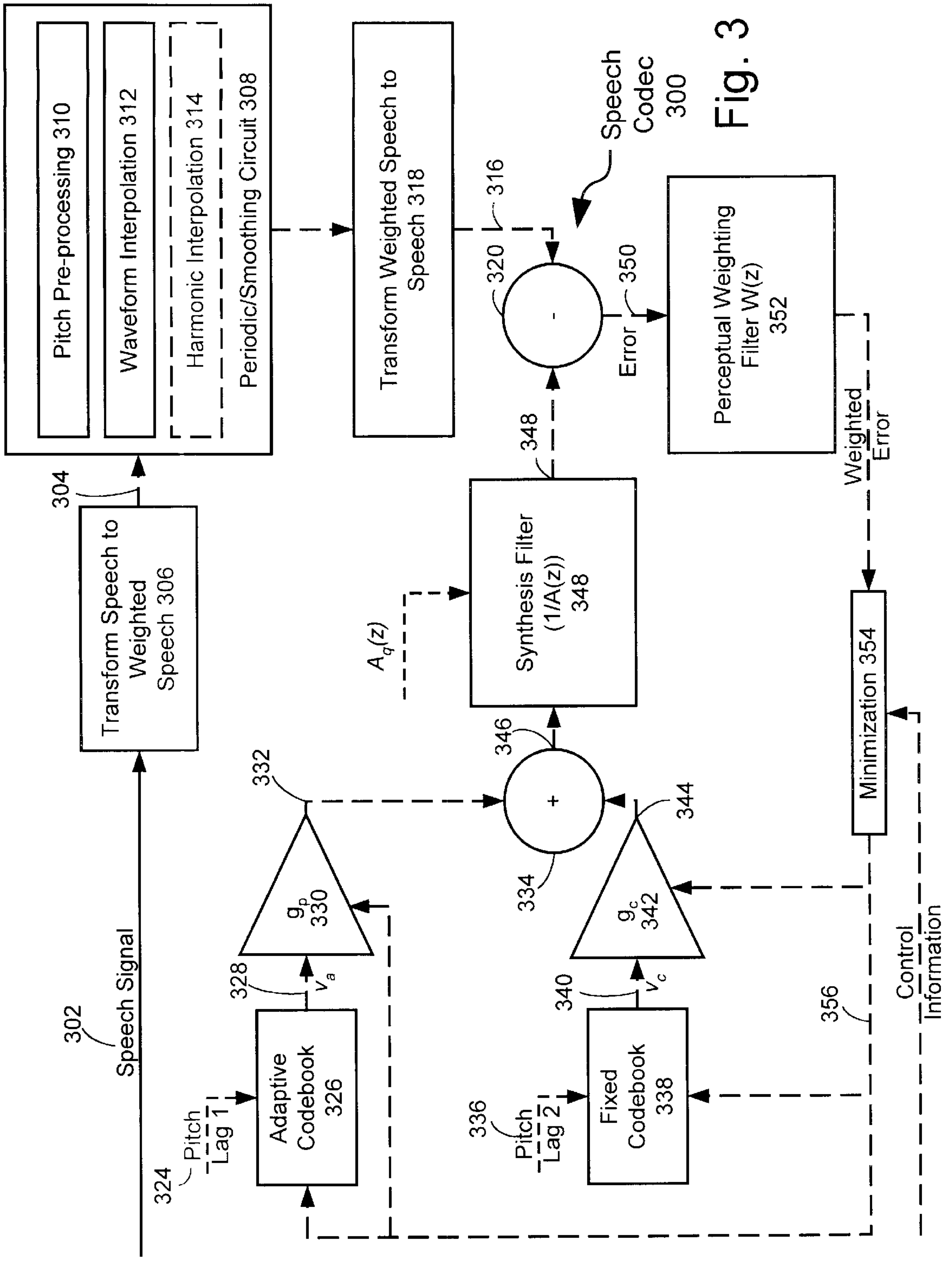
FIG. 3 illustrates a speech codec.

FIG. 3 is a diagram illustrating an embodiment of a speech codec 300. A speech signal 302, such as an unconditioned speech signal, is transformed into a weighted speech signal 304 at block 306. The weighted speech signal 304 is conditioned by a periodic/smoothing circuit at block 308. The periodic/smoothing circuit, block 308, includes a pitch-preprocessing block 310, a waveform interpolation block 312, and an optional harmonic interpolation block 314. The operation of the waveform interpolation block 312 or the harmonic interpolation block 314 can be performed before or after the pitch preprocessing block 310. The weighted speech signal 304 is transformed into a speech signal 316 at block 318 which is fed to a subtracting circuit 320.

As shown in FIG. 3, a pitch lag of one 324 is received by an adaptive codebook 326. A code-vector 328, shown as $v_a$, is selected from the adaptive codebook 326. After passing through a gain stage 330, shown as $g_p$, the amplified vector 332 is fed to a summing circuit 334. Preferably, a pitch lag, such as a pitch lag of two 336, is provided to a fixed codebook 338. In alternative embodiments, the pitch lag received by the fixed and the adaptive codebooks 326 and 338 may be equal or have a range of other values. A code-vector 340, shown as $v_c$, is generated by the fixed codebook 338. After being amplified by a gain stage 342, shown as $g_c$, the amplified vector 344 is received by the summing circuit 334.

When the two input signals $V_a g_p$ 332 and $V_c g_c$ 344 are added by the summing circuit 334, the combined signal 346 is filtered by a synthesis filter 348 that preferably has a transfer function of (1/A(z)). The output of the synthesis filter 348 is received by the subtracting circuit 320 and subtracted from the transformed speech signal 316. An error signal 350 is generated by this subtraction. The error signal 350 is received by a perceptual weighting filter W(z) 352 and minimized at block 354. Minimization block 354 can also provide optional control signals to the fixed codebook 338, the gain stage $g_c$ 342, the adaptive codebook 326, and the gain stage $g_p$ 330. The minimization block 354 can also receive optional control information.

Figure 4:
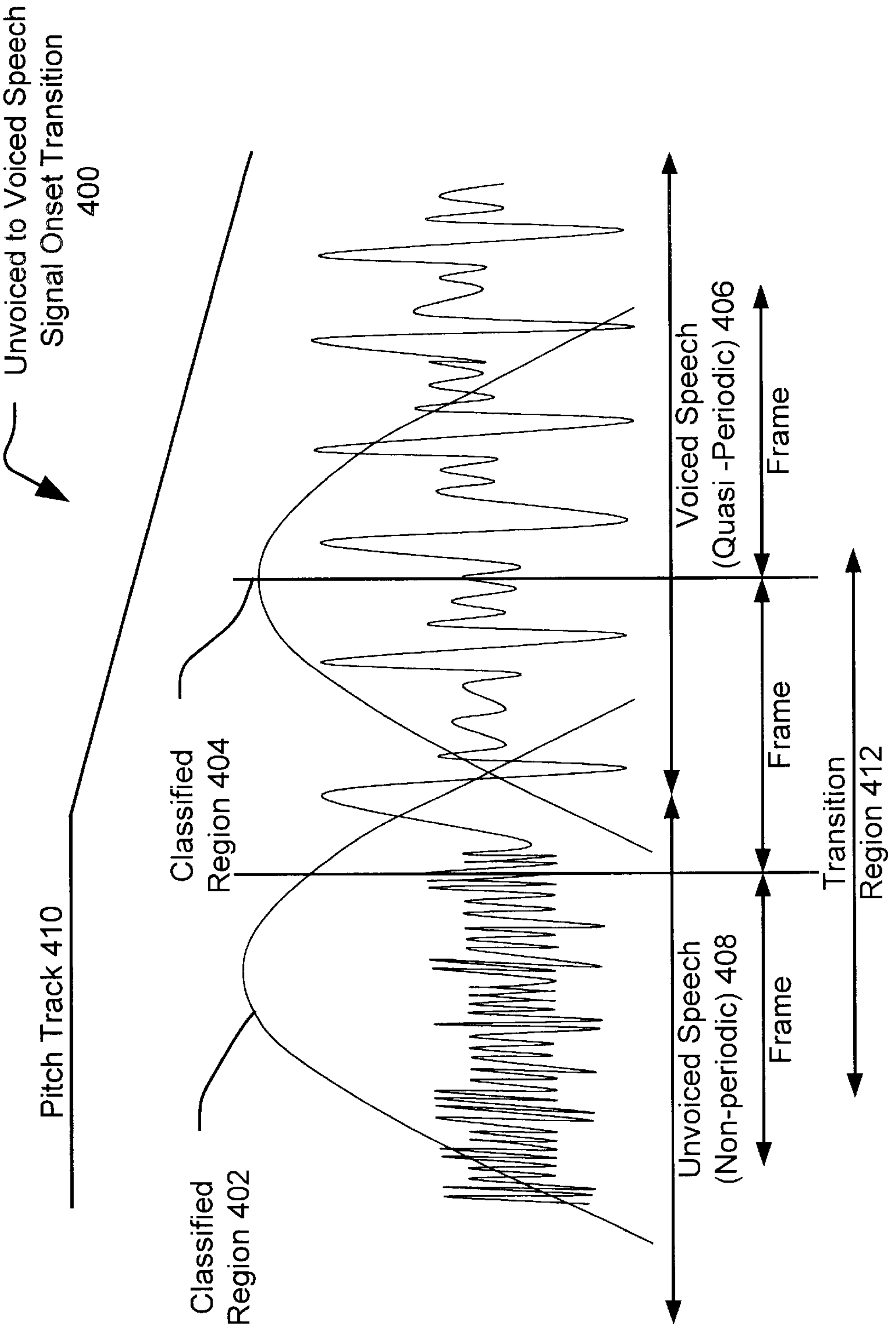
FIG. 4 illustrates an unvoiced to voiced speech signal onset transition region.

FIG. 4 illustrates an embodiment of an unvoiced to voiced speech signal onset transition 400. As shown, certain portions of a speech signal are separated into two classified regions 402 and 404 that extend through multiple frames. The speech signal comprises an unvoiced (non-periodic) portion 408 and a voiced (quasi-periodic) portion 406 that are linked through a transition region 412. A coded pitch track 410 that corresponds to the voiced 406 portion is used to perform backward pitch extension. The backward pitch extension is attenuated through time into the unvoiced portion 408 of the speech signal to ensure a smooth transition between the unvoiced portion 408 and the voiced portion 406. The classifier 210 detects the classified regions 402 and 404. The slope of the backward pitch extension is adaptable to many parameters that define the speech signal such as the difference in amplitude between the classified regions 402 and 404.

Figure 5:
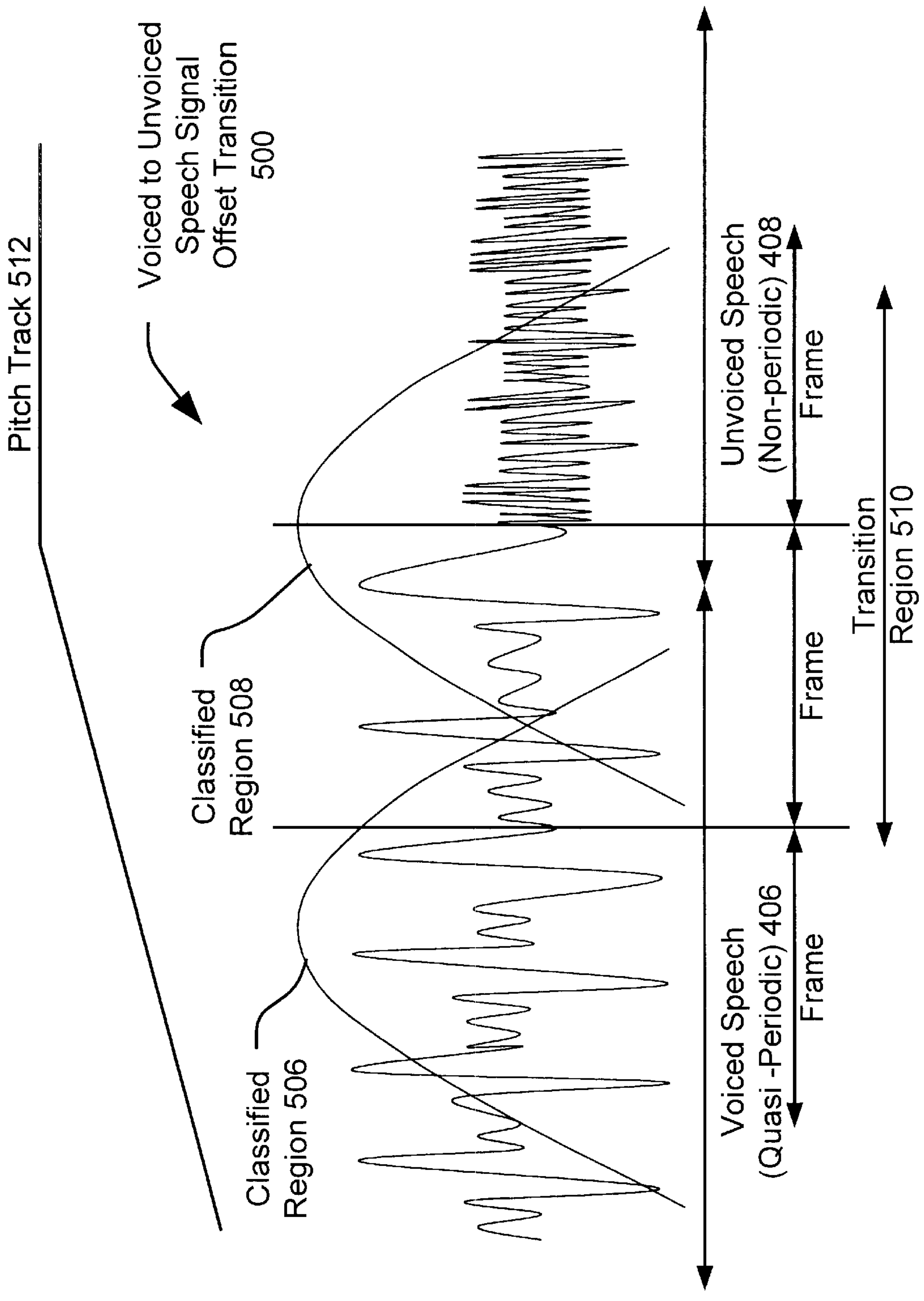
FIG. 5 illustrates a voiced to unvoiced speech signal offset transition region.

FIG. 5 illustrates an embodiment of a voiced 406 to unvoiced 408 speech signal offset transition 500. As shown, portions of the speech signal are separated into classified regions 506 and 508 that extend through multiple frames. The speech signal comprises a voiced portion 406 and an unvoiced portion 408 that are linked through a transition region 510. A pitch track 512 corresponding to the voiced portion 406 is used to perform a forward pitch extension. The forward pitch extension 512 is attenuated through time between the voiced portion 406 and the unvoiced portion 408. The classifier 210 detects the classified regions 506 and 508. The slope of the forward pitch extension 512 is adaptable to many parameters that define the speech signal such as the difference in amplitude between the classified regions 506 and 508.

Figure 6:
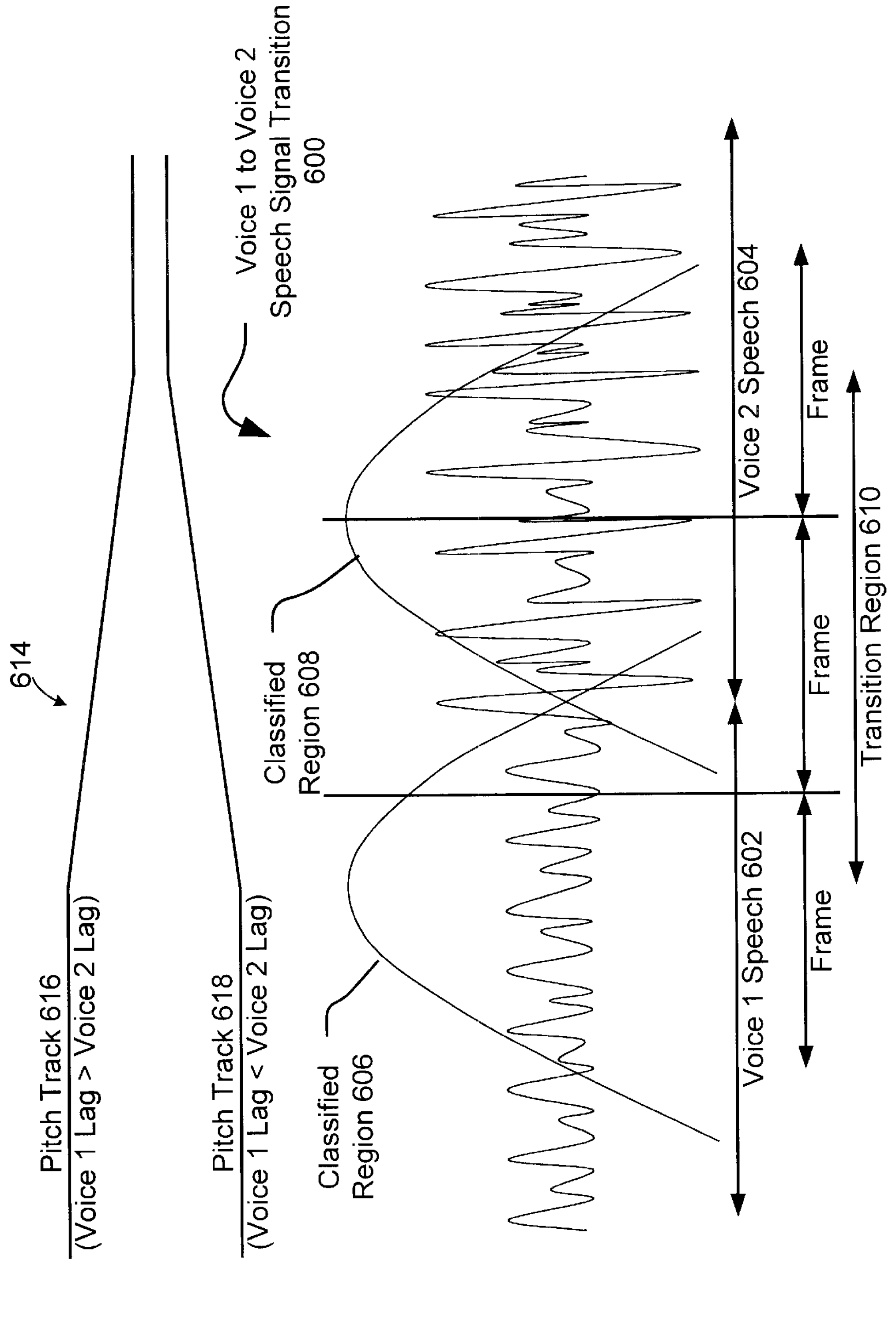
FIG. 6 illustrates a first voice to a second voice speech signal transition region.

FIG. 6 illustrates a transition 600 between a first voice (voice 1) 602 and a second voice (voice 2) 604 speech signal. As shown, certain portions of the speech signal are separated into classified regions 606 and 608 that extend through multiple frames. The speech signal comprises voice 1 speech 602 and voice 2 speech 604 linked through a transition region 610. A pitch track 614 corresponding to the voice 1 speech portion 602 and the voice 2 speech portion 604 is used to perform waveform interpolation or harmonic interpolation, which combines both forward and backward pitch extensions. The interpolation smoothes the harmonic structure, the energy level, and/or the spectrum in the transition region 610 between the two voiced speech portions 602 and 604 in time. In other words, the extensions and interpolation from both directions from one of the voiced speech portions to the other speech portion ensures a smooth transition between the voice 1 speech 602 and the voice 2 speech 604.

Two examples of a pitch track 614 are shown in FIG. 6. One pitch track 618 smoothly transitions from a lower pitch track level to a higher pitch track level through the transition region 610 between the voice 1 speech 602 and the voice 2 speech 604. This transition occurs when a voice 1 lag is less than a voice 2 lag. Another pitch track 616 smoothly transitions from a higher pitch track level to a lower pitch track level through the transition region 610 between voice 1 speech 602 and voice 2 speech 604. This transition occurs when the voice 1 lag is greater than the voice 2 lag. The classifier 210 is used to detect the classified regions 606 and 608. The smoothing and interpolation are adaptable to many parameters including the relative magnitude and frequency differences between the classified regions 606 and 608.

Figure 7:
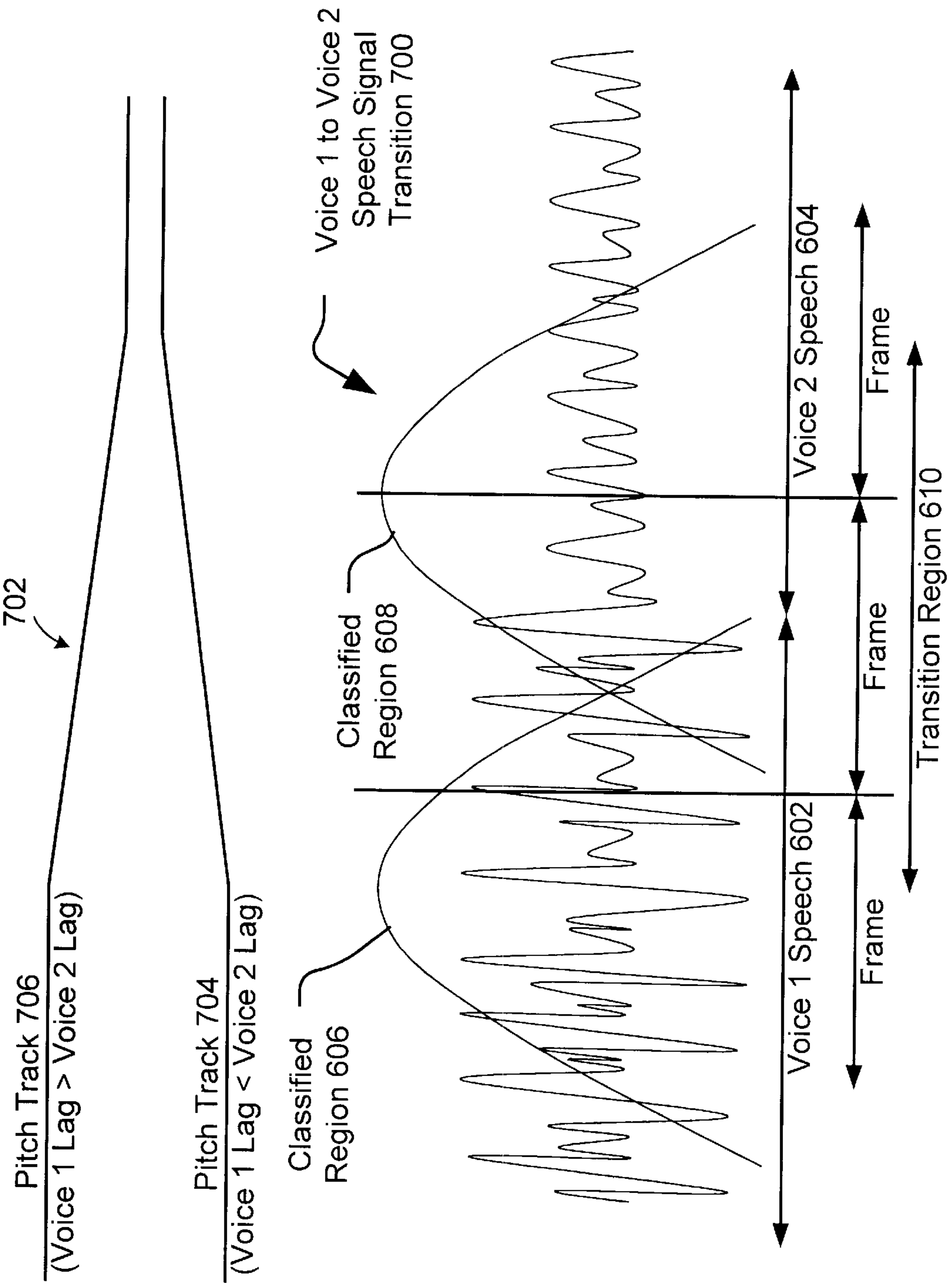
FIG. 7 illustrates a first voice to a second voice speech signal transition region.

FIG. 7 illustrates another embodiment of a voice 1 to a voice 2 speech signal transition 700. As shown, certain portions of a speech signal are classified into classified regions 606 and 608 that extend through multiple frames. A pitch track 702 corresponding to the voice 1 speech portion

602 and the voice 2 speech portion 604 is used to perform the interpolation, smoothing, or forward and backward pitch extension that ensure a smooth transition between the voice 1 speech portion 602 and the voice 2 speech portion 604.

Two examples of the pitch track 702 are shown in FIG. 7. One pitch track 704 smoothly transitions from a lower pitch track level to a higher pitch track level through the transition region 610 separating voice 1 speech 602 from voice 2 speech 604. This transition occurs when the voice 1 lag is less than the voice 2 lag. Another pitch track 706 smoothly transitions from a higher pitch track level to a lower pitch track level through the transition region 610. This transition occurs when the voice 1 lag is greater than the voice 2 lag. The classifier 210 is used to detect the classified regions 606 and 608. The smoothing and interpolation are adaptable to many parameters including the relative magnitude and frequency differences between the classified regions 606 and 608.

Figure 8:
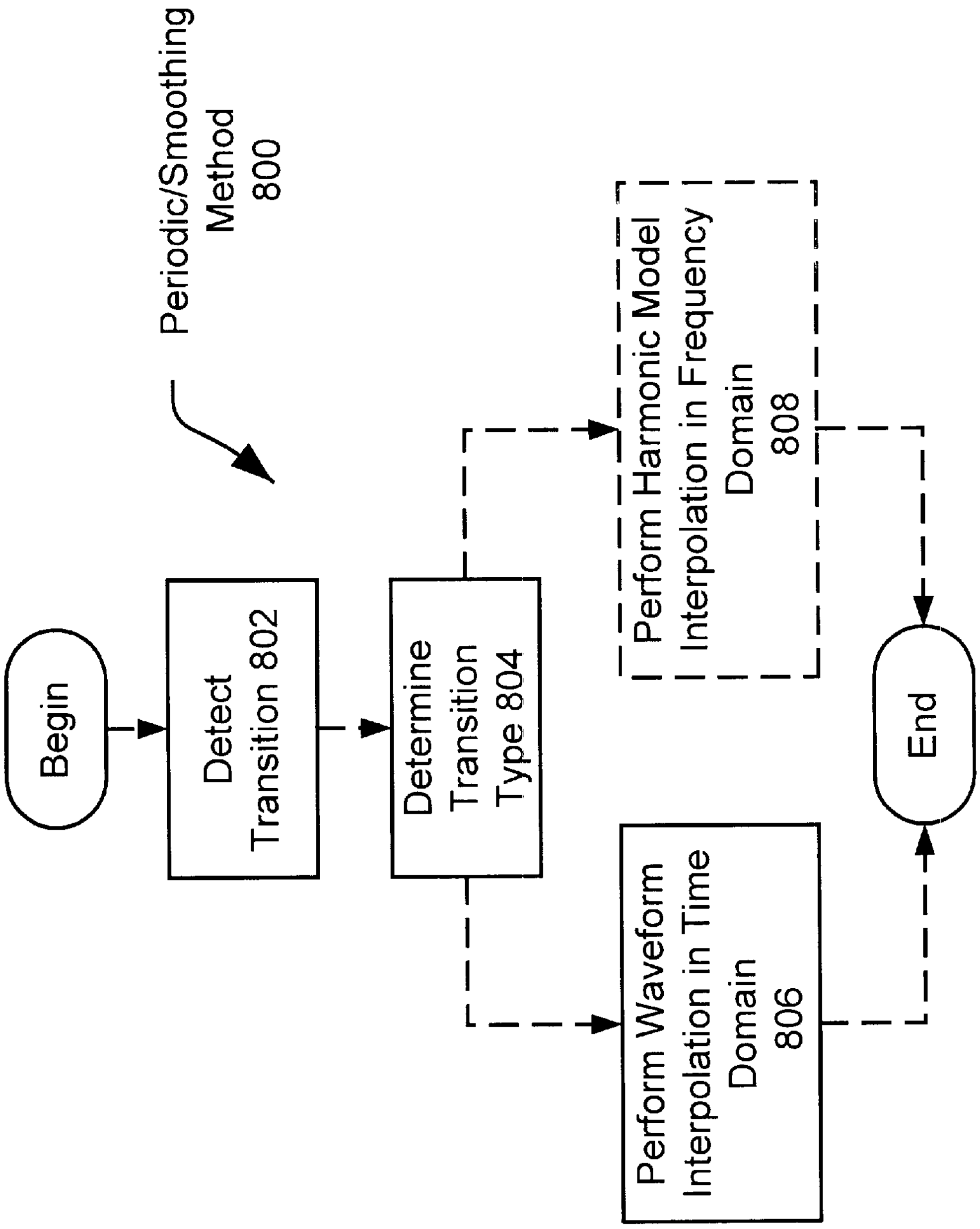
FIG. 8 illustrates a periodic/smoothing method.

FIG. 8 illustrates a periodic/smoothing method 800. At block 802, a transition region is detected. At block 804, the transition type is derived and either a frequency or time domain smoothing is selected. At block 806, waveform interpolation is performed on the transition region in the time domain. If desired, at optional block 808, a harmonic model interpolation is performed on the transition region in the frequency domain.

Figure 9:
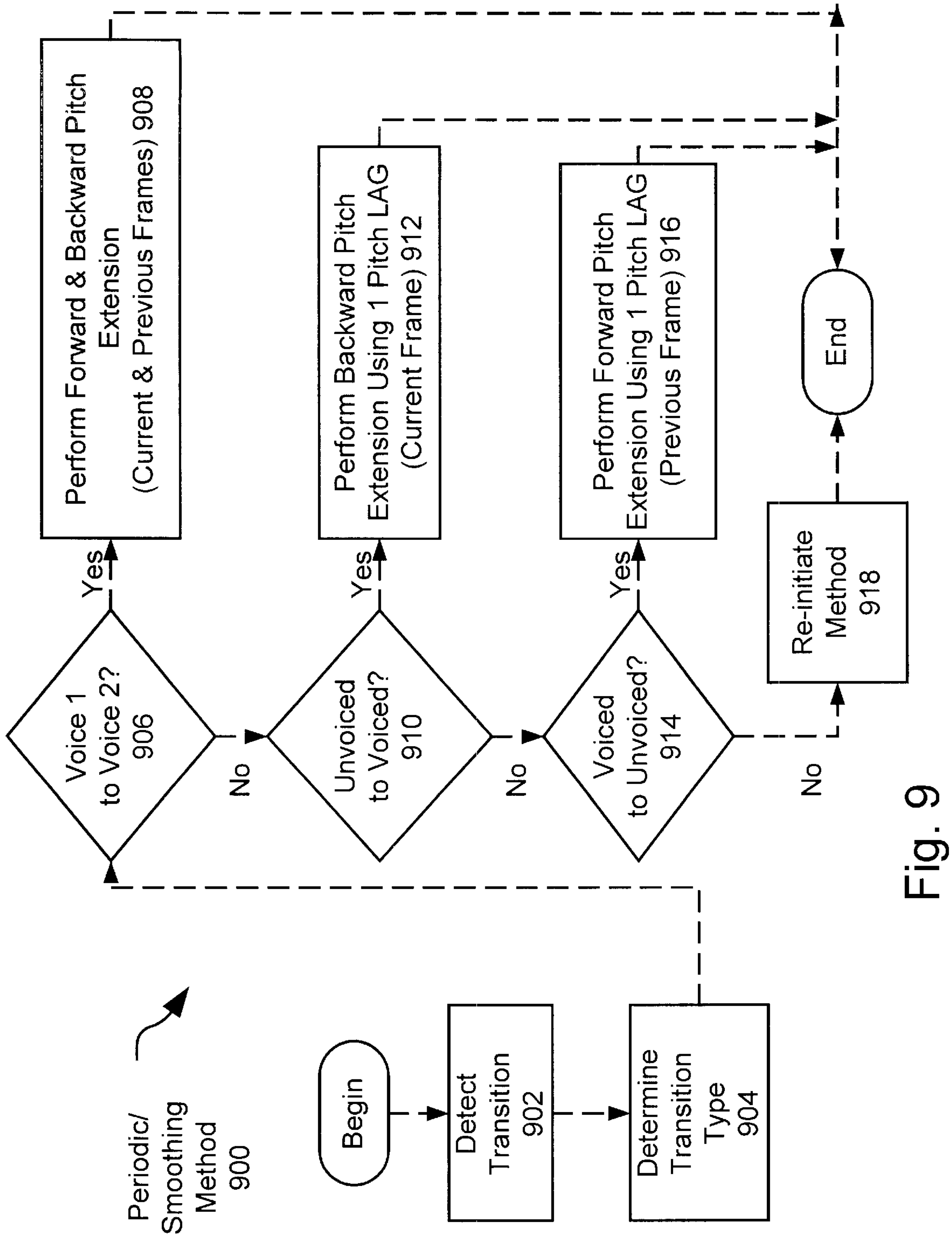
FIG. 9 illustrates a second periodic/smoothing method.

FIG. 9 is a block diagram illustrating an embodiment of a sequential periodic/smoothing method 900. At block 902, a transition region is detected. At block 904, the transition type is determined. Once the transition type is known, the transition region is smoothed by decision criteria. For example, if the detected transition type is of a voice 1 speech 602 to a voice 2 speech 604 type signal, then block 908 performs a forward and backward pitch extension using the pitch interpolation between two pitch lags. The two pitch lags are defined by the current and the previous speech frames of the signal. If it is determined that the transition type is from an unvoiced speech signal 408 to a voiced speech signal 406 at block 910, then at block 912 a backward pitch extension using a single pitch lag is performed using the current frame of the speech signal. If it is determined that the detected transition type is from a voiced speech signal 406 to an unvoiced speech signal 408 at block 914, then at block 916 a forward pitch extension using a single pitch lag is performed using the previous frame of the speech signal. If none of the decision blocks 906, 910, or 914 detect the speech segment type, then the periodic/smoothing method 900 is re-initiated at block 918.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A speech codec comprising a failure detection circuit configured to initiate a frequency transformation of a speech signal using a harmonic model circuit when said failure detection circuit detects at least one of a long term pre-processing circuit failure, a long term processing circuit failure, and an irregular voice speech portion of the speech signal;

a classifier configured to process parameters that identify a transition region between at least two portions of the speech signal, one of the at least two portions of the speech signal being a voiced portion; and a periodic smoothing circuit configured to smooth the transition region represented by at least one of a weighted representation of the speech signal, a residual signal, and the speech signal using at least one of an interpolated pitch lag and a constant pitch lag, the interpolated pitch lag being derived from a pitch track corresponding to the voiced portion of the speech signal, wherein the periodic smoothing circuit is configured to use at least one of a forward pitch extension and a backward pitch extension.

2. The speech codec of claim 1 wherein the other one of the at least two portions of the speech signal is a periodic portion.

3. The speech codec of claim 1 wherein the transition region extends through a plurality of frames of the speech signal.

4. The speech codec of claim 1 wherein at least one of the portions of the speech signal is an unvoiced portion.

5. The speech codec of claim 1 wherein the periodic smoothing circuit is configured to smooth the transition region using the harmonic model circuit.

6. A speech coding system comprising:

a failure detection circuit configured to initiate a frequency transformation of a speech signal using a harmonic model circuit when said failure detection circuit detects at least one of a long term pre-processing circuit failure, a long term processing circuit failure, and an irregular voice speech portion of the speech signal;

a classifier that is configured to detect a transition region between at least two portions of the speech signal, at least one portion of the speech signal being a periodic portion; and a periodic smoothing circuit that is configured to smooth the transition region using at least one of a forward pitch extension and a backward pitch extension, with either being derived from a pitch track corresponding to the periodic portion of the speech signal.

7. The speech coding system of claim 6 wherein the at least two portions of the speech signal are periodic portions.

8. The speech coding system of claim 6 wherein the periodic smoothing circuit is configured to smooth the transition region in a frequency domain using the harmonic model circuit.

9. The speech coding system of claim 6 wherein the classifier is configured to use at least one of a pitch lag, a linear prediction coefficient parameter, an energy level, and a normalized pitch correlation to classify the speech signal.

10. A method of smoothing a transition region comprising:

initiating a frequency transformation of a speech signal using a harmonic model circuit when at least one of a long term pre-processing circuit failure, a long term processing circuit failure, and an irregular voice speech portion of the speech signal is detected;

detecting a transition region between a periodic portion and a second portion of the speech signal; and smoothing the transition region using at least one of a forward pitch extension and a backward pitch extension, with either being derived from a pitch track corresponding to the periodic portion of the speech signal.

11. The method of claim 10 wherein the second portion of the speech signal is a periodic portion.

12. The method of claim 10 wherein the second portion of the speech signal is a voiced portion.

13. The method of claim 10 wherein the forward pitch extension is derived by calculating a pitch from a previous frame of the speech signal.

14. The method of claim 10 wherein the backward pitch extension is calculated from at least one of a current frame and a second frame of the speech signal.

15. A speech codec comprising a failure detection circuit configured to initiate a waveform interpolation of a speech signal in the time domain when said failure detection circuit detects at least one of a long term pre-processing circuit failure, a long term processing circuit failure, and an irregular voice speech portion of the speech signal;

a classifier configured to process parameters that identify a transition region between at least two portions of the speech signal, one of the at least two portions of the speech signal being a voiced portion; and a periodic smoothing circuit configured to smooth the transition region represented by at least one of a weighted representation of the speech signal, a residual signal, and the speech signal using at least one of an interpolated pitch lag and a constant pitch lag, the interpolated pitch lag being derived from a pitch track corresponding to the voiced portion of the speech signal, wherein the periodic smoothing circuit is configured to use at least one of a forward pitch extension and a backward pitch extension.

16. The speech codec of claim 15 wherein the other one of the at least two portions of the speech signal is a periodic portion.

17. The speech codec of claim 15 wherein the transition region extends through a plurality of frames of the speech signal.

18. The speech codec of claim 15 wherein at least one of the portions of the speech signal is an unvoiced portion.

19. The speech codec of claim 15 wherein the failure detection circuit is further configured to initiate a frequency domain smoothing of the speech signal using a harmonic circuit.

20. A speech coding system comprising:

a failure detection circuit configured to initiate a waveform interpolation of a speech signal in the time domain when said failure detection circuit detects at least one of a long term pre-processing circuit failure, a long term processing circuit failure, and an irregular voice speech portion of the speech signal;

a classifier that is configured to detect a transition region between at least two portions of the speech signal, at least one portion of the speech signal being a periodic portion; and a periodic smoothing circuit that is configured to smooth the transition region using at least one of a forward pitch extension and a backward pitch extension, with either being derived from a pitch track corresponding to the periodic portion of the speech signal.

21. The speech coding system of claim 20 wherein the at least two portions of the speech signal are periodic portions.

22. The speech coding system of claim 20 wherein the periodic smoothing circuit is configured to smooth the transition region in a time domain using a waveform interpolation circuit.

23. The speech coding system of claim 20 wherein the periodic smoothing circuit is configured to smooth the transition region in a frequency domain using a harmonic model circuit.

24. The speech coding system of claim 20 wherein the classifier is configured to use at least one of a pitch lag, a linear prediction coefficient parameter, an energy level, and a normalized pitch correlation to classify the speech signal.

25. A method of smoothing a transition region comprising:

initiating a waveform interpolation of a speech signal in the time domain when at least one of a long term pre-processing circuit failure, a long term processing circuit failure, and an irregular voice speech portion of the speech signal is detected;

detecting a transition region between a periodic portion and a second portion of the speech signal; and smoothing the transition region using at least one of a forward pitch extension and a backward pitch extension, with either being derived from a pitch track corresponding to the periodic portion of the speech signal.

26. The method of claim 25 wherein the second portion of the speech signal is a periodic portion.

27. The method of claim 25 wherein the second portion of the speech signal is a voiced portion.

28. The method of claim 25 wherein the forward pitch extension is derived by calculating a pitch from a previous frame of the speech signal.

29. The method of claim 25 wherein the backward pitch extension is calculated from at least one of a current frame and a second frame of the speech signal.

* * * * *